United States Patent
Neal et al.

(10) Patent No.: US 8,031,227 B2
(45) Date of Patent: Oct. 4, 2011

(54) POSITION TRACKING SYSTEM

(75) Inventors: Homer A. Neal, Ann Arbor, MI (US); Cang Ye, Little Rock, AR (US); Jeremy Herr, Tulsa, OK (US)

(73) Assignee: The Regents of the University of Michigan, Ann Arbor, MI (US)

( * ) Notice: Subject to any disclaimer, the term of this patent is extended or adjusted under 35 U.S.C. 154(b) by 1375 days.

(21) Appl. No.: 11/369,572

(22) Filed: Mar. 7, 2006

(65) Prior Publication Data

US 2006/0197840 A1 Sep. 7, 2006

Related U.S. Application Data

(60) Provisional application No. 60/659,139, filed on Mar. 7, 2005.

(51) Int. Cl.
*H04N 5/225* (2006.01)
*G06K 9/00* (2006.01)
(52) U.S. Cl. ........................ 348/169; 382/103
(58) Field of Classification Search ............... 348/169
See application file for complete search history.

(56) References Cited

U.S. PATENT DOCUMENTS

| | | | | |
|---|---|---|---|---|
| 4,990,892 A | * | 2/1991 | Guest et al. | 340/573.4 |
| 5,023,709 A | * | 6/1991 | Kita et al. | 348/172 |
| 5,179,421 A | * | 1/1993 | Parker et al. | 356/139.06 |
| 5,268,734 A | * | 12/1993 | Parker et al. | 356/139.06 |
| 5,517,300 A | * | 5/1996 | Parker et al. | 356/139.06 |

(Continued)

FOREIGN PATENT DOCUMENTS

EP 0 813 040 12/1997

(Continued)

OTHER PUBLICATIONS

CameraMan 3e Product data sheet; posted Aug. 31, 2005; Copyright 2005 Grass Valley, Inc; 4 pages; http://www.thomsongrassvalley.com/docs/DataSheets/ips/camerman_3eds.pdf.

(Continued)

*Primary Examiner* — Lin Ye
*Assistant Examiner* — Amy Hsu
(74) *Attorney, Agent, or Firm* — Howard & Howard Attorneys PLLC (57) ABSTRACT

A position tracking system includes an infrared-sensitive device, such as an infrared camera that generates signals in response to detected infrared light in a field of view of the infrared-sensitive device. A processor is responsive to the signals generated by the infrared-sensitive device for determining a position of the detected infrared light. The processor also generates tilt and pan signals based on the position of the detected infrared light. A tilt and pan mechanism moves a visible-light video camera in response to the tilt and pan signals from the processor. The active infrared light-emitting device includes a loop having at least two infrared light-emitting elements disposed along the loop, on opposite sides of the loop. A control box is disposed in the loop and is in electrical communication with the infrared light-emitting elements. When the loop is disposed around an object that rotates relative to the infrared-sensitive device, a constantly unimpeded viewing channel is provided between the infrared-sensitive device and at least one of the elements due to the positioning of the elements. The position information obtained from the infrared-sensitive device is used to direct a visible-light camera to track the active infrared light-emitting device in a manner similar to that performed by a human camera operator.

16 Claims, 5 Drawing Sheets

U.S. PATENT DOCUMENTS

| | | | |
|---|---|---|---|
| 5,570,177 A * | 10/1996 | Parker et al. | 356/139.06 |
| 5,668,629 A * | 9/1997 | Parker et al. | 356/139.05 |
| 5,828,770 A | 10/1998 | Leis et al. | |
| 6,465,787 B1 | 10/2002 | Coulter et al. | |
| 6,608,688 B1 | 8/2003 | Faul et al. | |
| 6,675,040 B1 * | 1/2004 | Cosman | 600/427 |
| 6,785,402 B2 * | 8/2004 | Jouppi et al. | 382/103 |
| 6,801,637 B2 * | 10/2004 | Voronka et al. | 382/103 |
| 7,185,987 B2 * | 3/2007 | Tamura | 353/42 |
| 2001/0024512 A1 | 9/2001 | Yoronka et al. | |
| 2002/0153488 A1 * | 10/2002 | Utukuri et al. | 250/342 |
| 2003/0154262 A1 | 8/2003 | Kaiser et al. | |
| 2004/0032424 A1 * | 2/2004 | Florschuetz | 345/748 |
| 2004/0083035 A1 | 4/2004 | Ellis | |
| 2005/0105772 A1 * | 5/2005 | Voronka et al. | 382/103 |
| 2005/0128291 A1 * | 6/2005 | Murakami | 348/143 |

FOREIGN PATENT DOCUMENTS

| | | |
|---|---|---|
| EP | 0 813 073 | 12/1997 |

OTHER PUBLICATIONS

CameraMan 3ccd Presenter Camera System Installation and Operations Manual; 071838700 rev. c; dated Jun. 2005; posted Feb. 10, 2006; 74 pages; http://www.thomsongrassvalley.com/docs/Manuals/pv_legacy/L1203101-D1.pdf.

CameraMan 1-CCD Presenter Camera System Installation and Operations Manual; L1203101 Rev D1; dated 1999; posted 1999; 35 pages; http://www.thomsongrassvalley.com/docs/Manuals/cameras/cameramanpresenter/071-8386-00.pdf.

CameraMan 2018/3012 Presenter Camera System Installation and Operations Manual; L1206101 Rev B; dated 1998; posted 1998; 34 pages; http://www.thomsongrassvalley.com/docs/Manuals/pv_legacy/L1206101-B.pdf.

ParkerVission Announces Enhancements on Analog CameraMan® 3-CCD; 3; 3 pages; http://www.digitalbroadcasting.com/content/news/article.asp?DocID=%7B48E6E56C-5F7...; Dated Mar. 7, 2006.

* cited by examiner

POSITION TRACKING SYSTEM

CROSS REFERENCE TO RELATED APPLICATION

This application claims the benefit of U.S. Provisional Application Ser. No. 60/659,139 filed Mar. 7, 2005.

GOVERNMENT LICENSE RIGHTS

This invention was made with government support under grant number 0333580 awarded by National Science Digital Library division of the National Science Foundation. The government has certain rights in the invention.

BACKGROUND OF THE INVENTION

1. Field of the Invention

The subject invention generally relates to a position tracking system. More specifically, the subject invention relates to a position tracking system that includes an infrared-sensitive device for detecting infrared light, a processor for determining a position of the detected infrared light and for generating tilt and pan signals based on the position, and a tilt and pan mechanism for moving a visible-light video camera in response to the tilt and pan signals from the processor.

2. Description of the Related Art

Position tracking systems are known in the art and function through a number of different mechanisms in order to track a moving object. More specifically, the position tracking systems typically include a camera that detects either visible or infrared light. The camera may function by detecting visible or infrared light reflected from an object, by detecting disturbances in ambient visible or infrared light resulting from movement of the object within a field of view of the camera, or by detecting visible or infrared light emitted from a light-emitting device attached to the object. One such position tracking system is disclosed in United States Patent Publication No. 2005/012291 to Murakami.

The '291 publication discloses a visible light camera and an infrared camera for detecting light depending on the time of day, i.e., whether visible light is available from sunlight or whether only infrared light is available. The cameras generate signals in response to disturbances in detected light in the field of view of the camera, which result from movement of an object such as a person in the field of view. A processor is responsive to the signals generated by the camera. The processor uses an algorithm to determine a position of the object based on the signals from the cameras. The processor generates tilt and pan signals based on the position determined by the processor. The processor communicates the signals to tilt and pan mechanisms attached to the cameras. The tilt and pan mechanisms move the cameras in response to the tilt and pan signals from the processor in order to track the object.

With the tracking system of the '291 publication, other moving objects may be in the field of view of the cameras, thereby skewing the signals generated by the cameras and causing inaccuracies in the tilt and pan signals generated by the processor. Further, if the moving object were to enter an area of direct sunlight or other bright light, the visible light camera may detect a washed image in the area of the direct light, thus causing the tracking system to lose track of the object. The object may move behind other objects within a field of view of the camera, which may obscure the object from view and cause the tracking system to lose track of the object. Different lighting regions may also persist within the field of view of the camera that affect the signals generated by the camera. Each of these factors may affect the performance of the tracking system.

Another position tracking system is disclosed in U.S. Pat. No. 5,023,709 to Kita et al. The '709 patent discloses an infrared camera that generates signals in response to detected infrared light in a field of view of the infrared camera. The detected infrared, light originates from a "marker", which may be a strip of reflective tape that reflects infrared light that is applied to it or an infrared radiant that radiates infrared rays when infrared light is applied to it. The marker is affixed to a moving object, such as a person. The infrared light may originate from an infrared irradiation apparatus mounted adjacent to the infrared camera. A processor is responsive to the signals generated by the camera. The processor uses an algorithm to determine a position of the detected light based on the signals from the camera. The processor generates tilt and pan signals based on the position determined by the processor. The processor communicates the signals to tilt and pan mechanisms attached to the cameras. The tilt and pan mechanisms move the cameras in response to the tilt and pan signals from the processor.

With the tracking system of the '709 patent, the object having the mark affixed thereto may move behind other objects within a field of view of the camera, thus obscuring the mark from view and causing the tracking system to lose track of the mark. Further, the mark may be obscured beneath clothing, thereby causing the tracking system to lose track of the mark. Further obstruction may occur simply by the object rotating relative to the infrared camera, thereby obscuring the mark from view behind the rotating object. The infrared light may also reflect off of shiny surfaces, thereby skewing the signals generated by the infrared camera and causing the tracking system to lose track of the object.

U.S. Pat. No. 6,801,637 to Voronka et al. discloses another tracking system. The tracking system of the '637 patent employs a series of active markers that emit infrared light and that are placed at different points on a person's body. The sensors are pulsed such that only one sensor is emitting infrared light at any point in time. A position sensor includes three cameras that separately detect a position of each sensor, and relative movements of different body parts are tracked by compiling the data relative to each of the sensors. However, the cameras have a fixed field of view and cannot follow the sensors if the sensors move from the fixed field of view of the cameras. Further, the sensors are each attached to a control box through a wire. With the sensors being positioned at different points on the body, installation of the sensors is cumbersome and time consuming. With the sensors placed all over the body, the sensors are discrete and distracting. As such, the tracking system of the '637 patent is not suitable for all manner of position tracking applications.

U.S. Pat. No. 5,179,421 to Parker et al. and assigned to ParkerVision, Inc. also discloses another tracking system. Details of the tracking system disclosed in the '421 patent are further clarified in the cited product information for the "CameraMan" products from ParkerVision, Inc. The tracking system includes an infrared transmitter that transmits infrared light to an infrared receiver that is placed behind a rotating set of signal blocking blinders whose position at any time defines a view angle with a known position. The infrared receiver scans a field of view and detects a peak signal strength from the infrared transmitter. A processor then determines tilt and pan angles and positions a video camera based on the detected position of the peak signal strength. However, as stated in the "CameraMan: 3 ccd Presenter Camera System" Installation and Operations Manual, the infrared transmitter requires a direct line-of-sight link with the camera, i.e., the infrared receiver. Further, no hair or clothing can cover the sensors. Such features make the tracking system of the '421 patent cumbersome and may distract a person wearing the infrared transmitter. By scanning for a peak signal strength, the sensor of the '421 patent is susceptible to ambient infrared light reflecting off of shiny objects, as well as other sources of infrared light. Finally, as shown in the Installation and Operations Manuals, although the infrared transmitter may include infrared light-emitting elements disposed along a loop, a control box is not part of the loop and must be separately connected to the loop through a cable, thus making the infrared transmitter bulky and distracting.

Due to the deficiencies of the prior art, there remains an opportunity to provide a position tracking system and a method of tracking with the position tracking system that provides a constantly viewable source of infrared light to an infrared camera such that tracking is unimpeded, regardless of whether or not the source of infrared light is covered by clothing, hair, etc. There is also an opportunity to provide a position tracking system that may be set up quickly and that is not distracting to observers of a person being tracked.

SUMMARY OF THE INVENTION AND ADVANTAGES

The subject invention provides a position tracking system, a method of tracking with the position tracking system, and an active infrared light-emitting device for use in the position tracking system. The position tracking system includes an infrared-sensitive device, such as an infrared camera, that generates signals in response to detected infrared light in a field of view of the infrared-sensitive device. A processor is responsive to the signals generated by the infrared-sensitive device for determining a position of the detected infrared light. The processor also generates tilt and pan signals based on the position of the detected infrared light. The position tracking system further includes a visible-light video camera for recording visible light within the field of view as the infrared-sensitive device. A tilt and pan mechanism moves the visible-light video camera in response to the tilt and pan signals from the processor. The active infrared light-emitting device includes a loop having at least two infrared light-emitting elements disposed along the loop. The infrared light-emitting elements are disposed on opposite sides of the loop. A control box is disposed in the loop and is in electrical communication with the infrared light-emitting elements.

When the loop is disposed around an object that rotates relative to the infrared-sensitive device, such as a person, a constantly unimpeded viewing channel is provided between the infrared-sensitive device and at least one of the elements due to the positioning of the elements on opposite sides of the loop, which therefore positions the elements on opposite sides of the person's body. As a result, the infrared-sensitive device can constantly track the elements such that tracking with the infrared-sensitive device is unimpeded. Further, in order to use the position tracking system, the loop may be installed quickly by only placing the loop around a person's neck, waist, or other appendage and turned on. The infrared light-emitting elements are also capable of passing light through clothing, hair, paper, etc. so that the loop may be hidden beneath clothing, if desired. Further, the loop appears as an indiscrete accessory and is not distracting to observers of the person being tracked.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
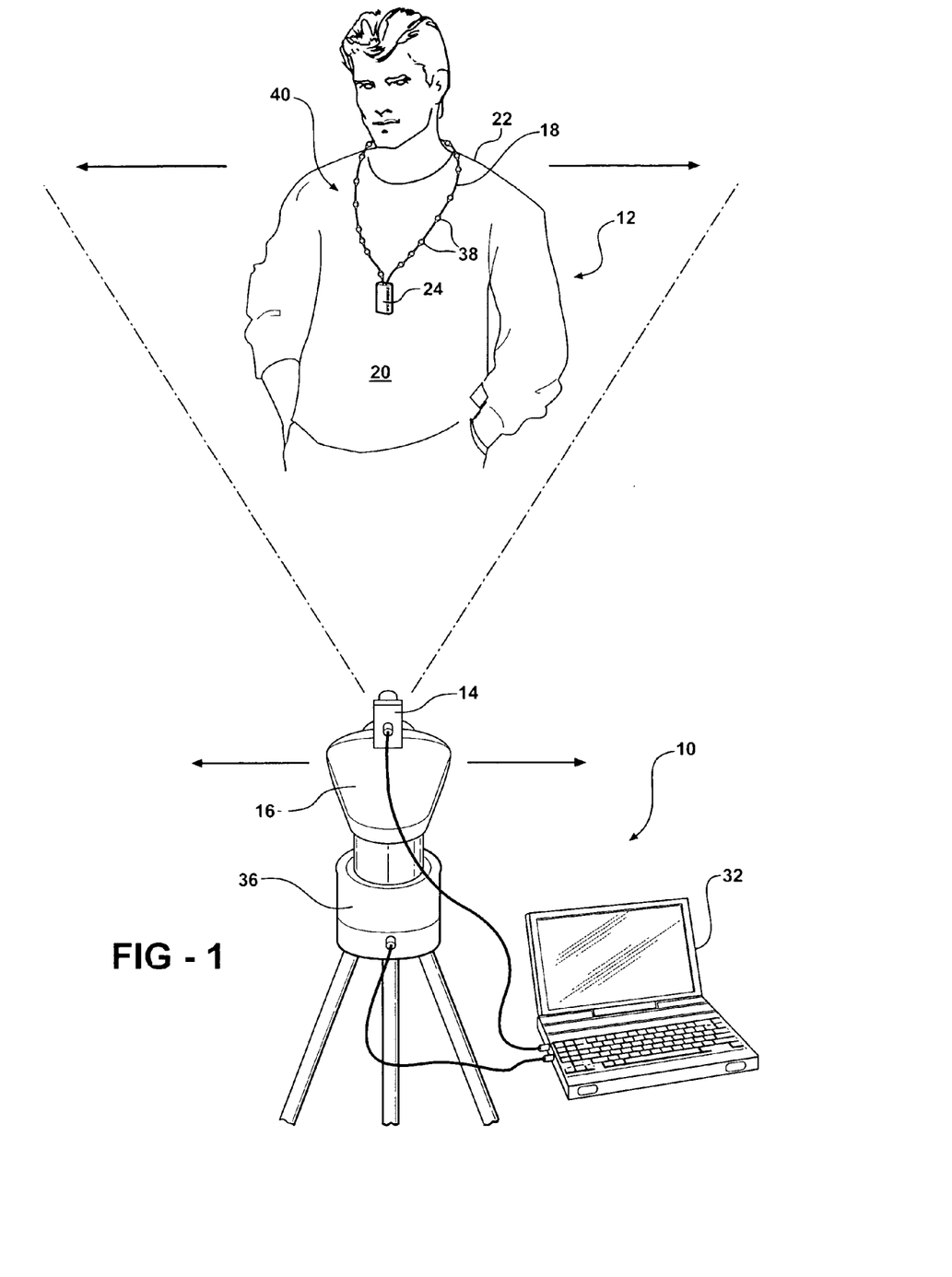
FIG. 1 is a top schematic view of a position tracking system of the present invention including an active infrared light-emitting device disposed around a person's neck, an infrared-sensitive device that detects infrared light and follows lateral movement of the person relative thereto, a processor that determines a position of the detected infrared light and that generates tilt and pan signals based on the position of the detected infrared light, visible-light video camera, and a tilt and pan mechanism for moving the visible-light video camera.
Figure 2:
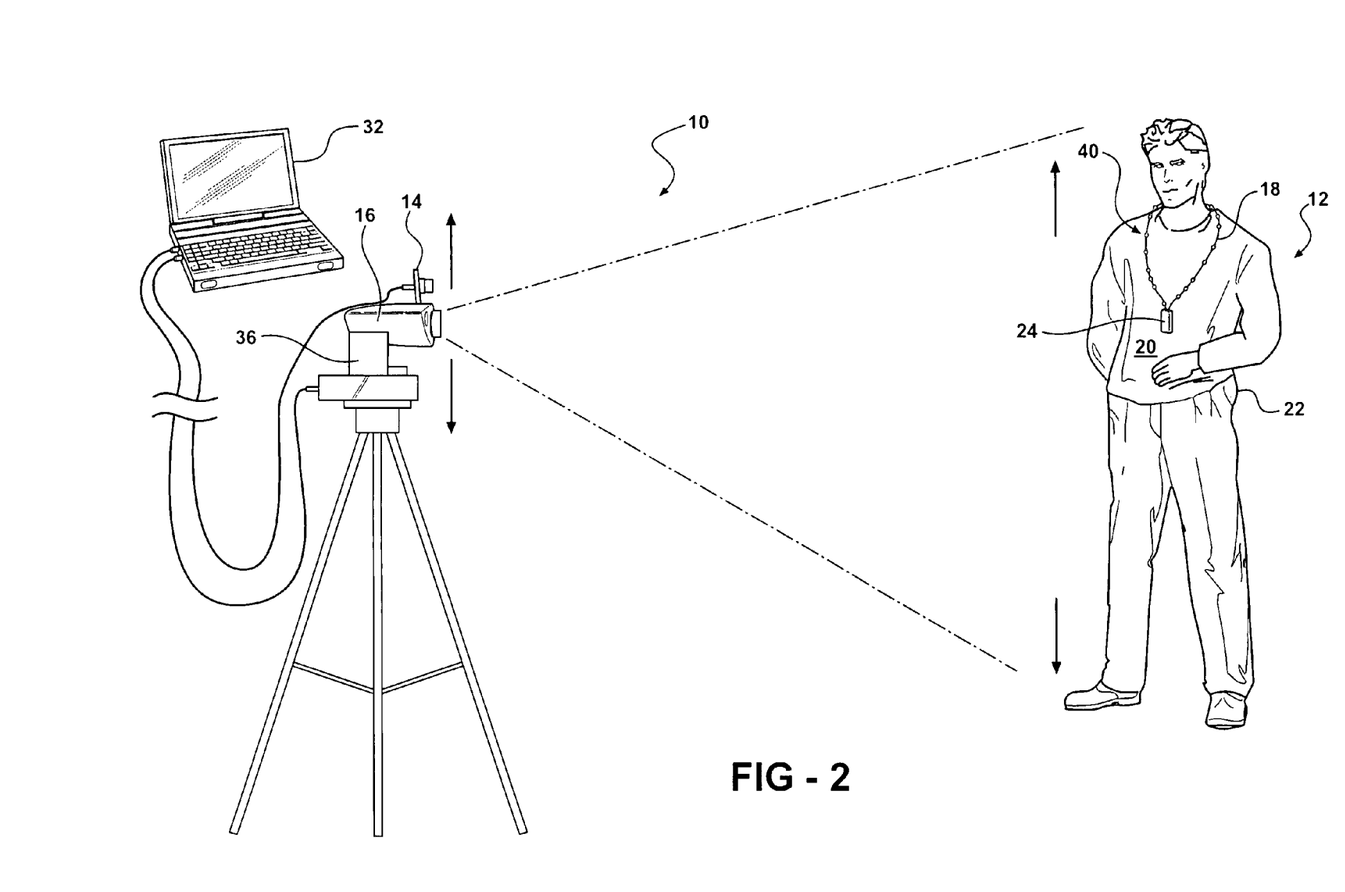
FIG. 2 is a side schematic view of the position tracking system of FIG. 1 showing the position tracking system tracking vertical movements of the person.

Referring to the Figures, wherein like numerals indicate corresponding parts throughout the several views, a position tracking system is shown generally at 10 in FIGS. 1 and 2. One of the contemplated uses for the position tracking system 10 is for tracking the movement of a lecturer 12 during a lecture or a seminar to enable a visible-light video camera 14 to track and record the lecturer 12 as the lecturer 12 moves around. The lecture or seminar may be recorded and stored for future use, used to network in remote attendees, and/or disseminated over the internet. The position tracking system 10 eliminates a need for a human camera operator, which adds expense to recording the lectures or seminars on video. It is contemplated that by using the position tracking system 10 of the present invention, a large volume of lectures may be recorded and archived without the expenses that typically accompany recording lectures. Although the position tracking system 10 of the present invention is useful for tracking the position of the lecturer 12 and recording lectures, other applications are also envisioned, such as military applications, security applications, motion picture applications, or any other application where tracking of a moving object 12 is desired.

The position tracking system 10 is based on active infrared technology. The position tracking system 10 includes an active infrared light-emitting device 40 that emits infrared light and an infrared-sensitive device 16, such as an infrared camera, that detects the infrared light emitted from the active infrared light-emitting device 40.

When the position tracking system 10 is used for tracking the movement of the lecturer 12, the active infrared light-emitting device 40 is typically worn by the lecturer 12. In order to facilitate easy placement of the active infrared light-emitting device 40, the device 40 includes a loop 18. The loop 18 has at least two infrared light-emitting elements 38 disposed along the loop 18 on opposite sides 20, 22 thereof. A control box 24 is typically disposed in the loop 18 in electrical communication with the infrared light-emitting elements 38 in order to provide power to and control the infrared light-emitting elements 38.

The infrared light-emitting elements 38 are positioned such that a constantly unimpeded viewing channel exists between the infrared-sensitive device 16 and at least one of the infrared light-emitting elements 38 when the loop 18 is disposed around an object 12 that rotates relative to the infrared-sensitive device 16, such as the lecturer 12. More specifically, in a broad sense, the loop 18 is a curved strand including electrical wires that connect the infrared light-emitting elements 38. Ultimately, the loop 18 is required to wrap around the object 12, i.e., the lecturer 12, in order to ensure that at least one infrared light-emitting element 38 is disposed on a front side 20 of the lecturer 12 and at least one infrared light-emitting element 38 is disposed on a back side 22 of the lecturer 12. In this way, the constantly unimpeded viewing channel always exists between the infrared-sensitive device 16 and at least one of the infrared light-emitting elements 38 regardless of a state of rotation of the lecturer 12 relative to the infrared-sensitive device 16, i.e., regardless of whether the lecturer 12 is facing toward or away from the camera, such as when writing on a chalk board.

Typically, the loop 18 is flexible in order to drape around objects 12, or lecturers 12, of different shape; however, it is possible that the loop 18 may have sufficient rigidity to maintain a desired shape. Said another way, the loop 18 may be bendable to wrap around and stay on an appendage of the object 12, such as an arm of the lecturer 12. To provide the rigidity to the loop 18, the loop 18 may further include a bendable support wire running parallel to the electrical wires.

Figure 4:
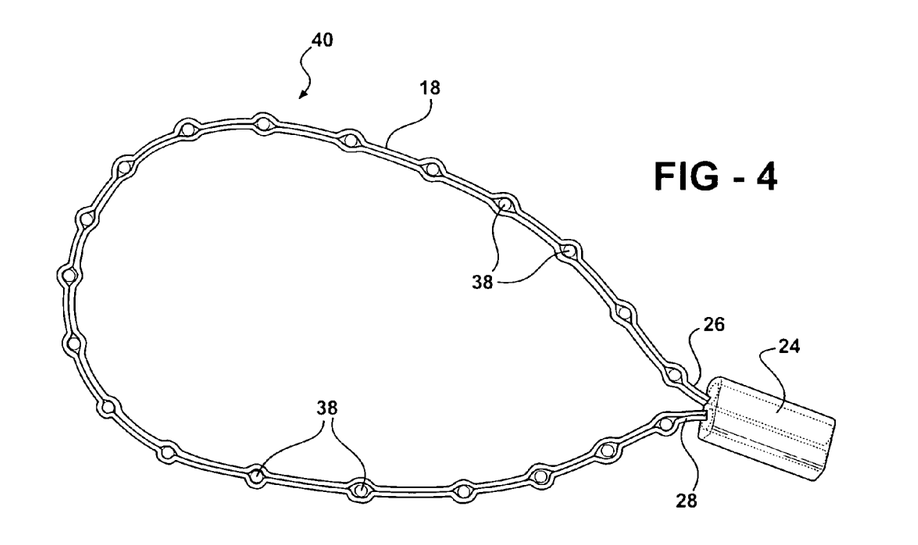
FIG. 4 is a perspective view of an active infrared light-emitting device that is used in the tracking system of the present invention.
Figure 7:
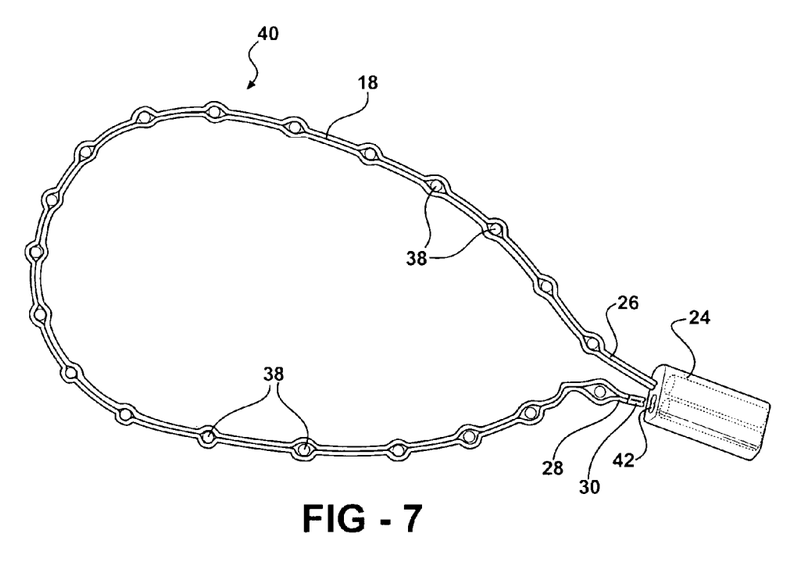
FIG. 7 is a perspective view of another embodiment of an active infrared light-emitting device that is used in the tracking system of the present invention.

The loop 18 may be a closed loop or an open loop. For example, in one embodiment as shown in FIG. 4, the loop 18 may be permanently closed with the control box 24 in the closed loop. The closed loop may be used as a necklace, which promotes quick and easy placement of the active infrared light-emitting device 40. In another embodiment, as shown in FIG. 7, the loop 18 may be an open loop having a first end 26 and a second end 28 adapted for connection to each other, with the control box 24 disposed in the open loop adjacent to one of the ends 26, 28. More specifically, the control box 24 may be at one end of the loop 18 and may include a connection site for receiving a prong 30 on the other end of the loop 18. Alternatively, the open loop may include the bendable support wire, thus eliminating the need to connect the ends 26, 28 of the loop 18 while still enabling the loop 18 to be wrapped around the object 12.

At least one of the infrared light-emitting elements 38 is disposed opposite the control box 24 across the loop 18. More specifically, it is contemplated that in most circumstances, the loop 18 will be used as a necklace. The control box 24 may act as a weight on the loop 18, thereby hanging directly beneath the lecturer's head. As a result, with the at least one of the infrared light-emitting elements 38 disposed opposite the control box 24 across the loop 18, the infrared light-emitting element 38 will be disposed adjacent the back of the lecturer's neck to ensure that at least one of the infrared light-emitting elements 38 is on the back side 22 of the lecturer 12. The second of the infrared light-emitting elements 38 is typically disposed adjacent the control box 24 to ensure that at least one of the infrared light-emitting elements 38 is disposed on the front side 20 of the lecturer 12.

Typically, the active infrared light-emitting device 40 includes more than two infrared light-emitting elements 38 in order to ensure that the unimpeded viewing channel always exists between the infrared-sensitive device 16 and at least one of the infrared light-emitting elements 38. More specifically, the infrared light-emitting elements 38 are typically spaced at intervals of less than or equal to 2 inches along the loop 18. The infrared light-emitting elements 38 are typically wired in parallel.

Suitable infrared light-emitting elements 38 may include infrared light-emitting diodes that emit light at a wavelength of about 880 nm. However, it is to be appreciated that any infrared light-emitting element 38 that emits light in the infrared spectrum is suitable for purposes of the present invention. The infrared light-emitting diodes typically have a light emission angle of at least 90°, more typically about 120°. This feature of the infrared light-emitting diodes makes the diodes visible to the infrared-sensitive device 16 at various viewing angles, such as with the lecturer 12 facing directly toward the infrared-sensitive device 16, as shown in FIGS. 1 and 2, or facing sideways.

Figure 5:
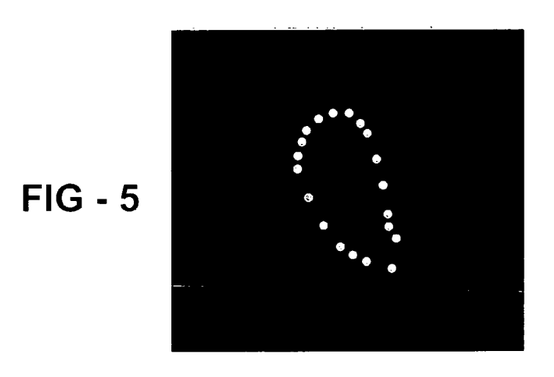
FIG. 5 is a photograph of a computer screen including a visual representation of signals generated by the infrared-sensitive device viewing the active infrared light-emitting device.

The infrared light-emitting diodes typically have a peak forward current of about 1.75 A, and a PWM circuit is typically used to allow the diodes to produce strong illumination. This makes the diodes emit infrared light that is very bright while avoiding heat problems and preserving battery life. Because the infrared light emitted from the diodes is so bright, and due to the wavelength of the infrared light, the infrared light may penetrate various materials such as clothing and paper. Importantly, the infrared light may typically be detected even if folded or worn beneath clothing, which is useful for the application of tracking the lecturer 12. For example, as shown in FIG. 5 wherein a manila folder is held in front of the active infrared light-emitting device 40, the infrared light can still be strongly detected by the infrared-sensitive device 16.

The infrared light-emitting diodes are typically surface mount electrical components and thus are very small in size of less than 5 mm wide, less than 5 mm long, and less than 3 mm deep. For example, preferred infrared light-emitting diodes are 3.0 mm wide, 3.4 mm long, and 2.1 mm deep. Due to the small size, the loop 18 can be put into a cloth tubing while the infrared light-emitting diodes sufficiently emit infrared light for the infrared-sensitive device 16 to detect the infrared light. Alternatively, the loop may be disposed inside a cloth key chain.

The control box 24 may function as both a power source for the infrared light-emitting elements 38 and a controller of the infrared light-emitting elements 38. More specifically, the control box 24 typically includes a battery compartment and terminals for receiving a battery or batteries that power the infrared light-emitting elements 38. Typically, the infrared light-emitting elements 38 are powered by two 1.5 V batteries.

The control box 24 may simultaneously pulsate the infrared light emitted from each of the infrared light-emitting elements 38 at a predetermined frequency. By pulsating the infrared light at the predetermined frequency, a processor 32 may be set to recognize only infrared light at the predetermined frequency, as opposed to ambient infrared light. The processor 32 is described in further detail below. As a result, tracking may be less prone to interference when the infrared light is pulsated. Further, by pulsating the infrared light, overheating of the infrared light-emitting elements 38 and needless power consumption is avoided, thereby extending the life of both the batteries and the infrared light-emitting elements 38. Further, the pulsating allows maximization of instantaneous brightness of the infrared light-emitting elements 38.

It is important that the infrared light-emitting elements 38 be simultaneously pulsed in order for the infrared-sensitive device 16 to be able to detect multiple infrared light-emitting elements 38. As described in further detail below, the simultaneous detection of the multiple infrared light-emitting elements 38 allows a "point to track" to be determined, which is indicative of a position of the active infrared light-emitting device 40. An RF transmitter may be used to synchronize a phase and frequency of the pulses with the infrared-sensitive device 16. When the infrared-sensitive device 16 is the infrared camera 16, a shutter of the infrared camera 16 may be controlled to ensure that the pulses are occurring exactly when the shutter is open. A very short exposure will drastically reduce background light, while the synchronization will ensure that infrared light emitted from the infrared light-emitting elements 38 is always visible.

The point to track is determined between the infrared light-emitting elements 38 and allows a position of the infrared light-emitting elements 38 to be tracked smoothly without interruption even if one or more of the infrared light-emitting elements 38 becomes obscured, such as by the lecturer 12 turning sideways. Typically, the control box 24 may be hard-wired to pulsate the infrared light at the predetermined frequency, and includes an on/off switch to either turn the infrared light-emitting elements 38 on or off. Alternatively, the control box 24 may further include a control switch (not shown) for controlling the pulse frequency.

The infrared-sensitive device 16 generates signals in response to detected infrared light in a field of view of the infrared-sensitive device 16. A suitable infrared camera 16 that may be used for purposes of the present invention is a Canon VC-C50i PTZ camera that sends out an NTSC video stream, i.e., the signals, at a frame-rate of 30 fps with an image resolution of 704×480 pixels. The camera may be controlled by the processor 32, which may be a computer, through a serial RS232 port. The signals may be transferred to the processor 32 using any NTSC S-video or composite video capture card. The infrared PTZ camera is one of several possible infrared-sensitive devices 16 that can be used to determine position of the infrared light-emitting device 40. Others include a stationary wide-angle infrared machine vision camera, and a Position Sensitive Device (PSD) mounted behind a wide-angle lens.

Typically, an infrared-pass filter 34 is used to allow only infrared light, i.e., light with a wavelength of greater than 850 nm, into the infrared camera 16. By using the infrared-pass filter 34, the effect of ambient lighting on the ability of the infrared camera 16 to function properly is greatly reduced, and the infrared camera 16 may operate independent of lighting conditions. For example, the infrared-sensitive device 16 may operate in total darkness, with the only light coming from the infrared light-emitting device 40. Signals generated by the infrared-sensitive device 16 may be visually represented as shown in the photograph of FIG. 5.

The position tracking system 10 further includes a visible-light video camera 14 for recording visible light within the field of view as the infrared-sensitive device 16. A tilt and pan mechanism 36 moves the visible-light video camera 14 based on signals from the processor 32. The tilt and pan mechanism 36 is typically integrated with the infrared-sensitive device 16, with the visible-light video camera 14 mounted to the infrared-sensitive device 16, and the tilt and pan mechanism 36 may be controlled through the same port through which the infrared-sensitive device 16 sends signals to the processor 32.

However, it is to be appreciated that the tilt and pan mechanism 36 may control the visible-light video camera 14 independent of the infrared-sensitive device 14. The tilt and pan mechanism 36 may be controlled through the RS323 port of the processor 32, as can IRIS and zoom parameters of the infrared-sensitive device 16 itself.

As alluded to above, the position tracking system 10 further includes the processor 32. The processor 32 is responsive to the signals generated by the infrared-sensitive device 16 for determining a position of the detected infrared light. The processor 32 also generates tilt and pan signals based on the position, which are used to control the tilt and pan mechanism 36 to maintain the active infrared light-emitting device 40 within the field of view of the visible-light video camera 14.

The processor 32 determines the position of the detected infrared light in a two-dimensional coordinate image plane based on the signals from the infrared-sensitive device 16. More specifically, the processor 32 determines the point to track, which is indicative of the position of the active infrared light-emitting device 40, based on the infrared light from the at least two infrared-light emitting elements 38. The processor 32 does this by acquiring a still image of the infrared video stream, i.e., the signals, from the infrared-sensitive device 16, as represented in FIG. 5. The image plane is superimposed on the still image. A center point within a ring of the detected infrared lights, as shown in FIG. 5, is typically used as the point to track. Alternatively, if a ring of the detected infrared lights is not available, the point to track may be a midpoint of a line of detected infrared lights.

The processor 32 determines a distance of the point to track from a set point in the image plane. More specifically, the processor 32 correlates the point to track to a set point representing a desired position of the active infrared light-emitting device 40 within the field of view of the infrared-sensitive device 16 and the visible-light video camera 14. The set point is typically represented by the intersection of the two coordinates.

Figure 6:
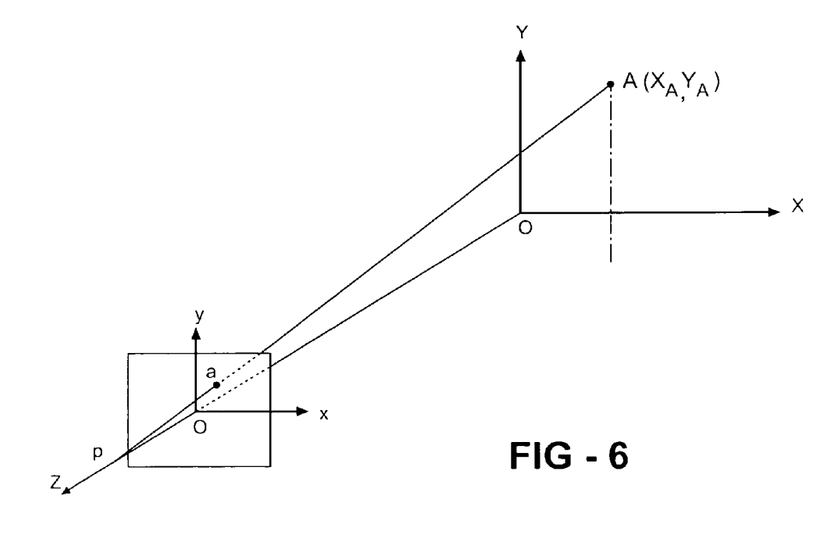
FIG. 6 is a schematic view of a correlation between actual position of the active infrared light-emitting device relative to the infrared-sensitive device and a position of the active infrared light-emitting device as viewed by the infrared-sensitive device.

The point to track may be at the same point in the image plane as the set point. In this situation, the visible-light video camera 14 need not be moved, since the active infrared light-emitting device 40 is in the desired position within the field of view of the visible-light video camera 14, and the processor 32 does not generate tilt and pan signals. The same is true if the point to track exhibits only minor movement relative to the set point over a period of time. Alternatively, when the point to track is different from the set point in the image plane, or when the point to track exhibits more than minor movement from the point to track, the processor 32 may generate tilt and pan signals for the tilt and pan mechanism 36 to move the visible-light video camera 14, and optionally the infrared-sensitive device 16, based on the change in position of the point to track relative to the set point. The tilt and pan signals are generated based on the correlation between the actual position of the active infrared light-emitting device 40 (represented by "A", "$X_A$", and "$Y_A$" in FIG. 6), and the position of the active infrared light-emitting device 40 in the image plane (represented by represented by "a", "$x_a$", and "$y_a$" in FIG. 6), with a focal point "p" of the infrared-sensitive device 16 disposed on a "Z" axis relative to the image plane. A deviation between the set point and the position of the active infrared light-emitting device 40 in the two dimensional coordinate image plane is represented by the following equations:

$$\theta = \tan^{-1}\frac{y_a}{f} \text{ and } \varphi = \tan^{-1}\frac{x_a}{f}$$

wherein θ is represents a tilt angle and is an angle between the Z axis and a line connecting a focal point p of the infrared-sensitive device 16 and the "$y_a$" coordinate of the point to track on the "y" axis, φ represents a pan angle and is an angle between the "Z" axis and a line connecting the focal point p of the infrared-sensitive device 16 and the "$x_a$" coordinate of the point to track on the "x" axis, and f is the focal length of the infrared-sensitive device 16, i.e., a distance from the focal point p to the two-dimensional coordinate image plane. Based on the calculation of θ, i.e., the tilt angle, and φ, i.e., the pan angle, the processor 32 may determine actual tilt and pan signals based on the differences of those angles to the prior position of the point to track. The processor 32 sends those signals to the tilt and pan mechanism 36 to adjust the infrared-sensitive device 16 accordingly.

It is desirable to minimize movement of the infrared-sensitive device 16 when movement of the infrared light-emitting device 40 is only minor, and to restrict the processor 32 to generating tilt and pan signals only when the point to track moves a substantial distance from the set point. Said another way, a shaky image may result if the processor 32 generated tilt and pan signals for every small movement of the active infrared light-emitting device 40. As such, the processor 32 is typically set to include a simple heuristic such as a command to not generate tilt and pan signals if the recommended angle is too small. Typically, such a heuristic would encompass movements of the active infrared light-emitting device 40 of less than 2 feet from 30 feet away, although the corresponding movements in the image plane are more important, as they determine the smoothness of the generated color video, and this movement threshold can be adapted to the way each lecturer moves.

Figure 3:
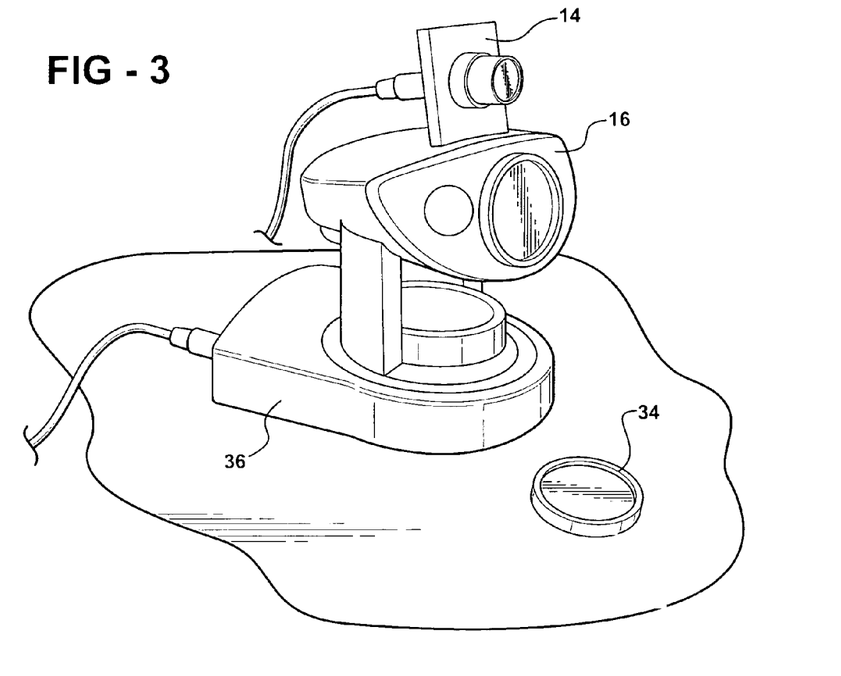
FIG. 3 is a perspective view of an infrared-sensitive device that is used in the tracking system of the present invention with a visible-light video camera mounted on the infrared-sensitive device.

As set forth above, the position tracking system 10 further includes the visible-light video camera 14 for recording within the same field of view as the infrared-sensitive device 16. The visible-light video camera 14 may be any commercially available video camera and is used for recording the lecture, seminar, or other event for which the position tracking system 10 is used to record. The visible-light video camera 14 also moves in response to the tilt and pan signals from the processor 32 for recording the field of view of the infrared-sensitive device 16. Typically, as set forth above, the visible-light video camera 14 is mounted directly to the infrared-sensitive device 16, as shown in FIG. 3. However, it is to be appreciated that the visible-light video camera 14 may be spaced from the infrared-sensitive device 16 and controlled by the tilt and pan mechanism independent of the infrared-sensitive device 16. When the visible-light video camera 14 is mounted directly to the infrared-sensitive device 16, the field of view of the visible-light video camera 14 will be slightly different from the field of view of the infrared-sensitive device 16, resulting in a slight offset of the point to track relative to the set point in the field of view of the visible-light video camera 14. The offset, when the visible-light video camera 14 is mounted directly on top of the infrared-sensitive device 16, is represented by the following equation:

$$\Delta Y = \frac{f}{f+R} \times d$$

wherein ΔY is the offset, f is the focal length of the camera, d is the distance between the optical axes of the two cameras, and R is the distance between the image plane and the active infrared light-emitting device 40. R is typically much greater than either f or d. As such, ΔY is typically negligible unless the active infrared light-emitting device 40 is within a few feet of the cameras 14, 16.

The position tracking system 10 of the present invention may further include a software package, which may be especially advantageous when the position tracking system 10 is used to record lectures or seminars. The software package synchronizes the recording from the visible-light video camera 14 and slides from a presentation, which is typically an electronic presentation such as a PowerPoint® presentation. In order to synchronize the recording and the slides, information relative to the slides from the presentation may be captured with a VGA splitter in conjunction with a capture card and dedicated software to provide a VGA signal. The VGA signal is detected by the processor 32 and captures exactly what the audience sees and enables automatic detection of screen changes that represent a modification or switching of slides. In this way, date and time of the lecture may be correlated with the view from the audience at any particular point in time during the lecture. The processor 32 may be a single computer that is used to capture the VGA signal, the recording from the visible-light video camera 14 along with audio, and to determine the position of the detected infrared light. Alternatively, separate computers may be used.

Once the VGA signal and the recording from the visible-light video camera 14 are captured, the software package automatically extracts metadata as to date, time, text, and other information that can be harvested from the VGA signal. The software package may detect when each slide change occurs and may tag images of the slides with time stamps in order to synchronize the timing of the slides with the recording of the lecture. The software package may also use Optical Character Recognition (OCR) that recognizes text in the slides while tagging corresponding moments of appearance of the text through the recording of from the visible-light video camera 14.

The synchronized recording and presentation may be compiled into an integrated view on a computer or television screen for observation by a user who is remote in either time or space. Typically, the recording from the visible-light video camera 14, slides from the presentation, audio, screen captures, etc., and an XML representation of information needed to construct a viewable lecture, such as the timing of the slides, the metadata, and the names and locations of media files are stored in a "Lecture Object" format in order to archive the synchronized recording and presentation for future and/or remote use. The text for each slide, which is extracted using OCR, may be stored in a word-searchable format so that when a particular keyword is queried, the recording of the lecture is started at that point in time when the slide was shown.

Obviously, many modifications and variations of the present invention are possible in light of the above teachings. The invention may be practiced otherwise than as specifically described within the scope of the appended claims. In addition, the reference numerals in the claims are merely for convenience and are not to be read in any way as limiting.

What is claimed is:
1. A position tracking system comprising:
   an infrared-sensitive device that generates signals in response to detected infrared light in a field of view of said infrared-sensitive device;

a processor responsive to said signals generated by said infrared-sensitive device for determining a position of the detected infrared light with said processor generating tilt and pan signals based on said position, wherein said processor determines said position of the detected infrared light in a two-dimensional coordinate image plane based on said signals and determines a distance of said position from a set point in the two-dimensional coordinate image plane;

a visible-light video camera for recording visible light within the same field of view as the infrared-sensitive device;

a tilt and pan mechanism that moves said visible-light video camera in response to said tilt and pan signals from said processor; and an active infrared light-emitting device including a loop having at least two infrared light-emitting elements disposed along said loop on opposite sides thereof and a control box disposed in said loop in electrical communication with said infrared light-emitting elements for providing a constantly unimpeded viewing channel between said infrared-sensitive device and at least one of said elements when said loop is disposed around an object that rotates relative to said infrared-sensitive device;

wherein said loop is further defined as necklace or accessory to be placed around a person's waist, neck, or other appendage.

2. A position tracking system as set forth in claim 1 wherein said loop is further defined as a closed loop with said control box disposed in said closed loop in electrical communication with said infrared light-emitting elements.

3. A position tracking system as set forth in claim 2 wherein at least one of said infrared light-emitting elements is disposed opposite said control box across said loop.

4. A position tracking system as set forth in claim 3 wherein infrared light-emitting elements are spaced at intervals of less than or equal to two inches along said loop.

5. A position tracking system as set forth in claim 1 wherein said infrared light-emitting elements are further defined as infrared light-emitting diodes having a width of less than 5 mm, a length of less than 5 mm, and a depth of less than 3 mm.

6. A position tracking system as set forth in claim 1 wherein said loop is further defined as an open loop having a first end and a second end adapted for connection to each other with said control box disposed in said open loop adjacent to one of said ends and in electrical communication with said infrared light-emitting elements.

7. A position tracking system as set forth in claim 1 wherein said processor generates tilt and pan signals based on the distance of said position from said set point.

8. A position tracking system as set forth in claim 1 further comprising a software package that synchronizes a recording from said visible-light video camera and slides from a presentation.

9. A position tracking system as set forth in claim 1 wherein the processor determines a point to track between the infrared light-emitting elements that is indicative of the position of the detected infrared light.

10. A position tracking system as set forth in claim 9 wherein the point to track is a center point within a ring of the detected infrared lights.

11. A method of tracking with a position tracking system including an infrared-sensitive device, a processor, a visible-light video camera, a tilt and pan mechanism, and an active infrared light-emitting device, said method comprising the steps of:

generating signals with the infrared-sensitive device in response to detected infrared light in a field of view of the device;

transmitting the signals to the processor;

determining a position of the detected infrared light in a two-dimensional coordinate image plane based on the signals with the processor;

determining a distance of the position from a set point in the two-dimensional coordinate image plane with the processor;

generating tilt and pan signals with the processor based on the position;

transmitting the tilt and pan signals to the tilt and pan mechanism;

moving the visible-light video camera with the tilt and pan mechanism in response to the tilt and pan signals from the processor;

placing the active infrared light-emitting device on an object that rotates relative to the infrared-sensitive device;

emitting infrared light from the active infrared light-emitting device including a loop having at least two infrared light-emitting elements disposed along the loop on opposite sides thereof, wherein said loop is further defined as necklace or accessory to be placed around a person's waist, neck, or other appendage; and providing a constantly unimpeded viewing channel between the infrared-sensitive device and at least one of the elements.

12. A method as set forth in claim 11 further comprising the step of simultaneously pulsating the infrared light emitted from each the elements at a predetermined frequency.

13. A method as set forth in claim 11 further comprising the step of synchronizing a recording from the visible-light video camera and slides from a presentation.

14. A method as set forth in claim 11 wherein the step of generating tilt and pan signals is further defined as generating the tilt and pan signals with the processor based on the distance of the position from the set point.

15. A method as set forth in claim 11 wherein the processor determines a point to track between the infrared light-emitting elements that is indicative of the position of the detected infrared light.

16. A method as set forth in claim 15 wherein the point to track is a center point within a ring of the detected infrared lights.

* * * * *